United States Patent
Kitaoka et al.

[11] Patent Number: 5,872,407
[45] Date of Patent: *Feb. 16, 1999

[54] LINEAR MOTOR

[75] Inventors: Toshio Kitaoka, Toyokawa; Makato Izawa, Kariya; Yasuhiro Matsumoto, Toyokawa; Katsuhiro Nanba, Okazaki, all of Japan

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 624,083

[22] Filed: Mar. 29, 1996

[30] Foreign Application Priority Data

Mar. 31, 1995 [JP] Japan .................................. 7-075613

[51] Int. Cl.$^6$ .................................................. H02K 41/00
[52] U.S. Cl. ...................................... 310/12; 310/68 B
[58] Field of Search ................................ 310/12, 13, 14, 310/68 B

[56] References Cited

U.S. PATENT DOCUMENTS 4,789,815 12/1988 Kobayashi et al. ..................... 318/135
5,161,361 11/1992 Talley et al. ......................... 310/68 B X
5,461,270 10/1995 Didier ................................. 310/68 B

FOREIGN PATENT DOCUMENTS 53-147219 12/1978 Japan .
62-207168 9/1987 Japan .
2-65656 3/1990 Japan .

*Primary Examiner*—Steven L. Stephan
*Assistant Examiner*—Judson H. Jones
*Attorney, Agent, or Firm*—Burns, Doane, Swecker & Mathis, LLP

[57] ABSTRACT

A linear motor has a stator and a movable piece. The stator has a field magnet for propulsion. The movable piece has a bobbin which includes a cylindrical member wrapping around the stator, an armature coil which is located around the bobbin, and a yoke which is attached around the armature coil. A groove is formed on the cylindrical member. At the bottom of the groove, a sensor is arranged for detecting the strength of the magnetic field from the field magnet.

16 Claims, 3 Drawing Sheets

LINEAR MOTOR

BACKGROUND OF THE INVENTION

1. Field of the Invention

The present invention pertains to a linear motor having a field magnet stator for propulsion and a movable piece having an armature coil.

2. Description of the Related Art

Conventionally, in connection with this type of linear motor, coil bobbin 201 as shown in FIG. 1A is used in the manufacture of a movable piece, and armature coil 202 is mounted on this bobbin 201 as shown in FIGS. 1B and 1C.

Bobbin 201 in FIG. 1A comprises round flanges 201b located on either end of cylindrical part 201a. Armature coil 202 is formed between said flanges around cylindrical part 201a. Furthermore, cylindrical movable piece yoke 203 is attached around armature coil 202. Movable piece 20 is formed in this way, and is placed, using its bobbin 201, over a rod-like stator 10 having a round cross-sectional configuration and having field magnet 101, providing a linear drive motor.

Armature coil 202 of movable piece 20 comprises coils having different electric phases, which are arranged such that there is no gap on movable piece 20 in FIG. 1B. The coils on movable piece 20 in FIG. 1C, however, are arranged such that there is a gap between the coils.

Position detecting sensors that detect the current position of the movable piece relative to the field magnet are normally attached to the movable piece of a linear drive motor in order to control the electric current of the coils of different phases that comprise the armature coil in accordance with their positions so that constant propulsion may be obtained regardless of the position of the movable piece. Hall elements, which are magnetic-electric conversion elements, are most often used as such position detecting sensors. A Hall element senses the strength of the magnetic field generated by the field magnet. Movable piece propulsion may be continuously obtained regardless of the position of the movable piece by applying to the coil electric current having a volume and orientation corresponding to the strength of the magnetic field sensed by the Hall element.

In movable piece 20 shown in FIG. 1B, Hall elements h are attached to the outer surface of the armature coil such that they correspond to the coils of different phases. In movable piece 20 shown in FIG. 1C, Hall elements h are attached to the cylindrical part 201a of bobbin 201 such that they are sandwiched by the coils. In many cases, a sensor that detects the scale of an encoder that is used to detect the distance over which the movable piece traveled or to detect or control the speed of the movable piece (hereinafter called a scale detecting sensor) is used with the movable piece of a linear drive motor, in addition to the position detecting sensors described above.

An optical encoder, magnetic encoder, etc. is used as the encoder. When an optical encoder is used, the scale detecting sensor is an optical sensor and the scale is an optical scale that provides signals that can be detected by said sensor. When a magnetic encoder is used, the scale detecting sensor is a magnetic sensor (a representative example would be a sensor using a magnetic resistance element called an MR element) and a fine magnetized member comprising magnetic poles arranged with a small pitch (i.e., a magnetic scale) is used for the scale. The scale detecting sensor of such a construction is also placed at an appropriate position on the movable piece.

However, as shown in FIG. 1B, when sensors such as Hall elements and MR elements that detect magnetic information are placed on the outer surface of the armature coil, the distance between the sensor and the members that provide magnetic information such as the field magnet and magnetic scale on the stator at the center of the armature coil becomes large, which reduces the sensitivity, as well as the output signal power, of the sensors. As a result, it becomes necessary to amplify the signals, or to increase the amplification rate, as a result of which the problem of noise becomes more marked.

As shown in FIG. 1C, where sensors that detect magnetic information are located between the coils, the sensitivity of the sensors improves because they can be made closer to the members on the stator that provide magnetic information. However, since the coils are located with a gap in between, the drive motor itself becomes large in size, and since it is necessary to support the coils with the gap in between, the configuration of the coil bobbin that holds the coils becomes large and/or complex.

In addition, where an optical encoder is used, the scale detecting sensor must be placed close to and directly facing the optical scale. Therefore, when the optical scale is placed on the stator, the scale detecting sensor cannot be located on the outer surface of the armature coil or between the coils of different phases, and must be located away from the armature coil. In this case, the stator becomes large and complex to the same extent.

SUMMARY OF THE INVENTION

The main object of the present invention is to provide a linear drive motor comprising a stator having a field magnet for propulsion and a movable piece having an armature coil, wherein sensors that detect the information on the stator may be located at positions where said information can be detected with high sensitivity and accuracy.

Another object of the present invention is to provide a linear drive motor comprising a stator having a field magnet for propulsion and a movable piece having an armature coil, wherein said movable piece may be constructed with a compact configuration.

BRIEF DESCRIPTION OF THE DRAWINGS

These and other objects and features of the present invention will be apparent from the following description with reference to the accompanying drawings.

DETAILED DESCRIPTION OF THE PREFERRED EMBODIMENTS

The embodiments of the present invention are explained below with reference to the drawings.

Figure 1A:
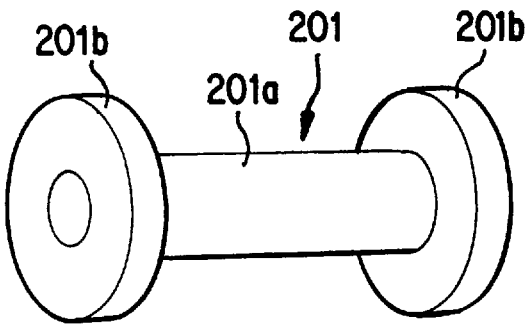
FIG. 1A is a perspective illustration of a bobbin on which an armature coil is placed in a conventional linear drive motor.
Figure 1B:
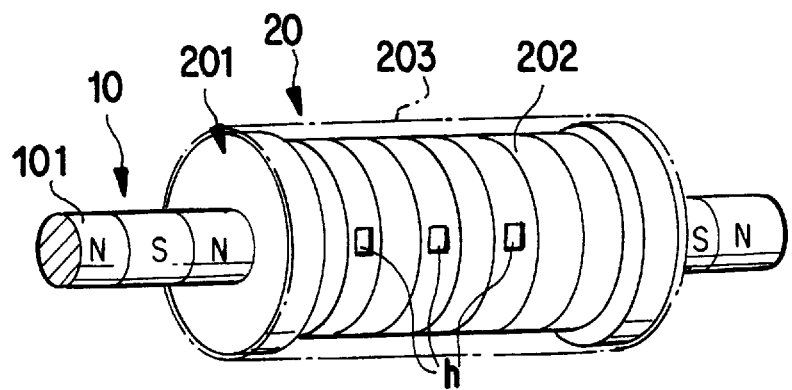
FIG. 1B is a simplified perspective illustration of an example of a conventional linear drive motor.
Figure 1C:
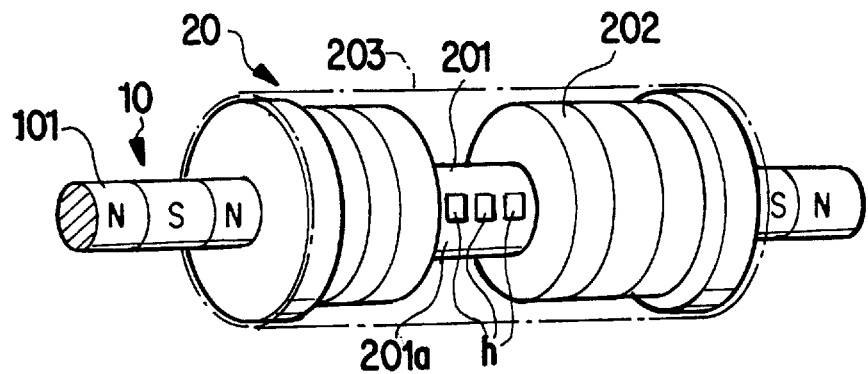
FIG. 1C is a simplified perspective illustration of another example of a conventional linear drive motor.
Figure 2:
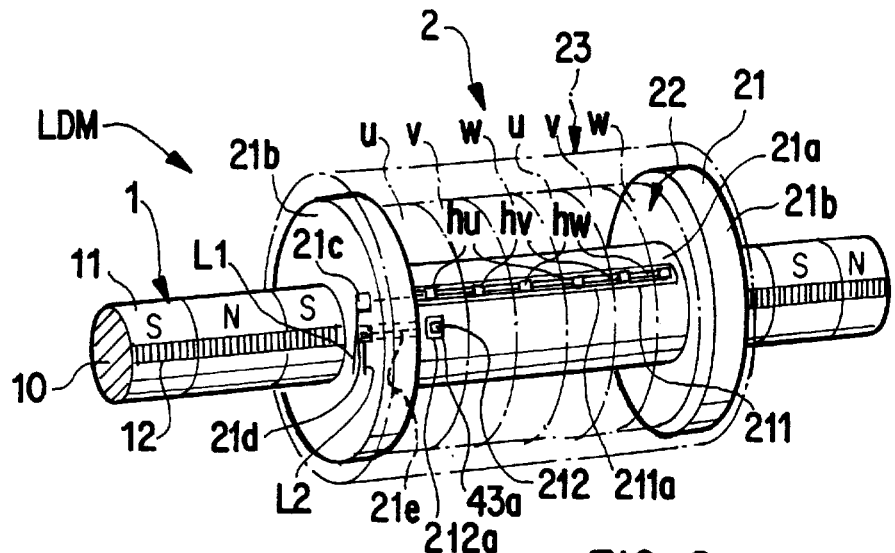
FIG. 2 is a simplified perspective illustration of an embodiment of the present invention.

FIG. 2 is a perspective illustration of an embodiment of a linear drive motor pertaining to the present invention. This linear drive motor LDM includes rod-like stator 1 and movable piece 2 that is attached to said stator 1 such that movable piece 2 wraps around said stator 1. Stator 1 comprises rod-shaped member 10 that is formed with a smooth surface using a material that can be mechanically processed and magnetized, wherein field magnet for propulsion 11 and fine magnetized member (magnetic scale) 12 are formed on rod-shaped member 10. Field magnet 11 is formed by alternately polarizing the N poles and S poles on the surface of rod member 10 along its shaft. Fine magnetized member 12 is formed by alternately polarizing the N poles and S poles on the surface of rod member 10 having a fine pitch along the shaft. Movable piece 2 includes coil bobbin 21 that wraps around stator 1, and can move back and forth along said stator 1. This bobbin has the same basic configuration as the bobbin shown in FIG. 1A, and has flanges 21b on either end of cylindrical member 21a.

Armature coil 22 is located around cylindrical member 21a of bobbin 21. This coil 22 is covered by cylindrical movable piece yoke 23.

Armature coil 22 comprises coils of three different phases, phase u, phase v and phase w, which are positioned $2\pi/3$ off from the preceding phase (or at positions having the same phases as said $2\pi/3$ off positions) in terms of electrical angle, such that the drive motor may be operated using the three-phase driving method, as described below. These coils are placed close together so that there is no gap in between.

Hall element hu is placed on the coil of phase u as a position detecting element, while Hall elements hv and hw are placed on the coils of phase v and phase w, respectively.

Magnetic sensor 43a that reads the magnetic information from fine magnetized member 12 is also placed on armature coil 22. This magnetic sensor 43a is a sensor using a magnetic resistance element called an MR element, and is a component of an encoder described below.

Hall elements hu, hv and hw are placed on thin member 211a provided at the bottom of groove 211 formed on the surface of cylindrical member 21a of bobbin 21 with the length of the groove aligned in the direction of the arrangement of the coils of different phases (along the directions in which the movable piece moves), such that the Hall elements are placed inside said groove. Groove 211 is formed at a position that corresponds to field magnet 11.

Groove 211 reaches flange 21b on one end of the bobbin and leads to hole 21c formed on said flange. Wiring L1 to the Hall elements is placed in this groove and pulled out through hole 21c so that it can be connected to circuits not shown in the drawing. In other words, groove 211 functions as part of a wiring unit. This and hole 21c together comprise the wiring unit.

On the other hand, magnetic sensor 43a is placed on thin member 212a provided at the bottom of concave member 212 formed on the surface of coil bobbin cylindrical member 21a, such that the magnetic sensor is placed inside said groove. Concave member 212 is formed at a position that corresponds to fine magnetized member 12.

Bobbin 21 has hole 21e that connects hole 21d formed on flange 21b located at one end of said bobbin with this concave member 212, and the wiring for sensor 43a is placed in said hole 21e. In other words, holes 21d and 21e comprise a wiring unit.

In linear drive motor LDM described above, propulsion is generated by applying electric current to armature coil 22 of movable piece 2 under current control such that movable piece 2 is driven along stator 1. The details of the current control are described below.

Since Hall elements hu, hv and hw that detect the strength of the magnetic field from field magnet 11 of stator 1 are placed on thin member 211a in this linear drive motor, the distance between these Hall elements and field magnet 11 is small, and therefore said Hall elements can accurately read the magnetic information with high sensitivity, and the accuracy of the operation of the drive motor is improved to this extent.

In addition, since magnetic sensor 43a is also placed on thin member 212a and close to fine magnetized member 12, this sensor 43a can also read the magnetic information from fine magnetized member 12 very accurately and with high sensitivity and little noise, which further contributes to the improved accuracy of the operation of the drive motor.

Furthermore, because there is no gap between the coils of different phases comprising armature coil 22 in spite of the fact that Hall elements hu, hv and hw and magnetic sensor 43a are used, movable piece 2, and therefore the entire linear drive motor LDM, is made compact and small.

Figure 3:
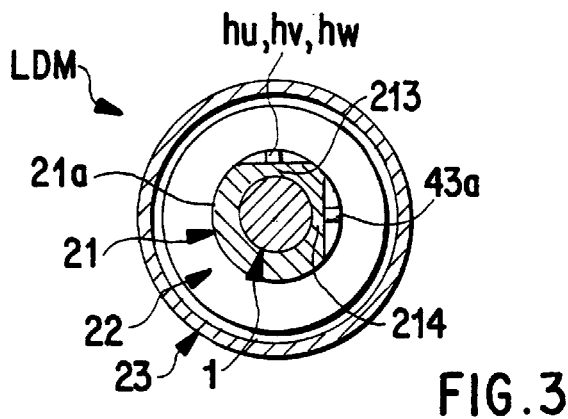
FIG. 3 is a cross-sectional view of another embodiment of the present invention, cut along a line perpendicular to the stator.

Linear drive motor LDM shown in FIG. 3 will now be explained.

In this linear drive motor, the outer circumference surface of bobbin cylindrical member 21a is configured so that its cross-section resembles the letter D, instead of having groove 211 and concave member 212 on coil bobbin 21 in the drive motor shown in FIG. 2. This creates thin member 213 used in order to place Hall elements close to field magnet 11 and thin member 214 used to place magnetic sensor 43a close to fine magnetized member 12. Hall elements hu, hv and hw are placed on one of the thin members, namely thin member 213, while magnetic sensor 43a is placed on the other, namely thin member 214. Although not shown in the drawing, thin members 213 and 214 are extended to bobbin flange 21b so that they can be used as wiring units as well. The construction of this embodiment is the same as that of the linear drive motor shown in FIG. 2 in other respects, and identical numbers are used for members which are also used in the drive motor in FIG. 2. In this linear drive motor as well, because of the placement of the Hall elements and magnetic sensor on thin members 213 and 214, the magnetic information on stator 1 can be read by these sensors with high sensitivity and accuracy as in the case of the linear drive motor in FIG. 2.

While the thin members are formed on the outer circumference surface of the bobbin facing the armature coil in the embodiment above, they may be formed on the inner circumference surface of the bobbin facing the stator or on both the outer and inner circumference surfaces.

Figure 4:
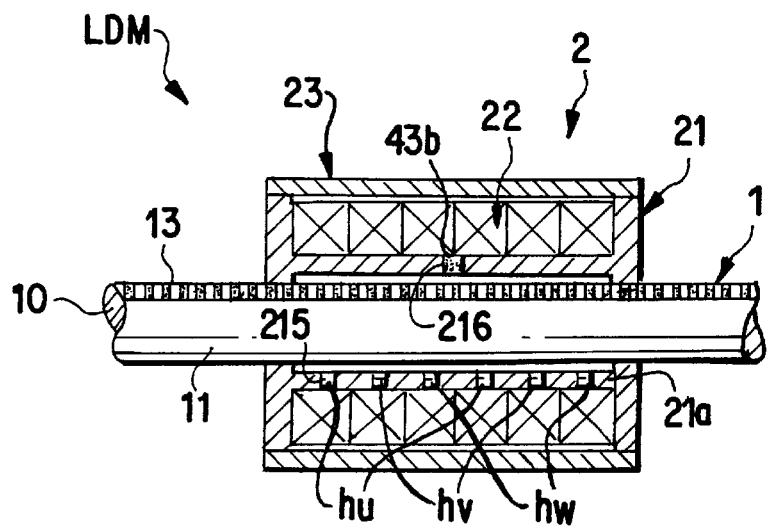
FIG. 4 is a cross-sectional view of yet another embodiment of the present invention, cut along the shaft of the stator.

Next, linear drive motor LDM shown in FIG. 4 will be explained. In this linear drive motor, optical scale 13 is used in place of magnetic scale 12 of stator 1 in the drive motor in FIG. 2, and optical sensor 43b is used in place of magnetic sensor 43a of movable piece 2. By means of these, an optical encoder is provided.

Optical scale 13 has signals that are to be read by sensor 43b. The optical reflectance of optical scale 13 used in this embodiment is varied by means of irregularities with a fine pitch. Signals may also be given using such other methods as changing the surface so that it exhibits roughness with a fine pitch, or applying paint. There is no limitation regarding optical sensor 43b as long as the sensor reads these signals.

In this linear drive motor, Hall elements hu, hv and hw are placed in hole 215 formed on bobbin cylindrical member 21a, as a result of which they are located close to and directly facing field magnet 11. Therefore, the detection of the strength of the magnetic field of field magnet 11 by Hall elements hu, hv and hw is performed with high sensitivity, as in the case of the drive motor in FIG. 2.

In addition, optical sensor 43b is placed in hole 216 formed on bobbin cylindrical member 21a, as a result of which it is located close to and directly facing optical scale 13. Therefore, the reading of scale 13 by sensor 43b can be performed with high sensitivity and accuracy. This improves the accuracy of the operation of the drive motor and contributes to the attainment of compactness and small size of the linear drive motor. The basic construction of this embodiment is the same in other respects as the linear drive motor in FIG. 2, and identical numbers are used for members which are also used for the drive motor in FIG. 2.

Examples in which either thin members or holes are formed were explained in the embodiments above, but it is also acceptable to form both a thin member and hole.

Since magnetic or optical encoders are employed in the embodiments above, the surface of the stator can be made flat and smooth. Therefore, the movable piece can move smoothly with little load.

The control of the operation of linear drive motor LDM described above will now be explained.

As described, field magnet 11 of stator 1 has a distribution of the magnetic flux density in sine wave form in which an N pole and an S pole forms one cycle. Again, as described above, armature coil 22 of movable piece 2 comprises coils u, v and w of three different phases which are located at positions $2\pi/3$ off from the preceding coil in terms of electrical angle (or at positions having the same phase as the $2\pi/3$ off positions), and Hall elements hu, hv and hw are located on movable piece 2. In this embodiment, these Hall elements detect the strength of the magnetic field of field magnet 11 at the positions where they are situated. Linear drive motor LDM is operated by applying electric current having a volume and orientation corresponding to the strength of the magnetic field detected by these Hall elements.

In other words, the so-called three-phase driving method is employed here, in which signals whose phases are 120 degrees off from the preceding signal are input to the coil so that constant propulsion may consequently be obtained regardless of the position of movable piece 2. In addition to employing said three-phase driving method, the phase lock loop method, which is generally called the PLL method, is also employed so that movable piece 2 is driven at the target speed.

Figure 5A:
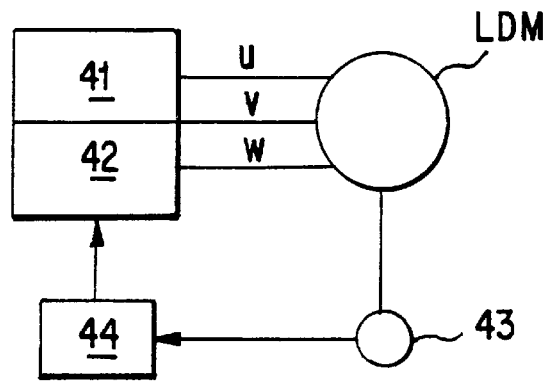
FIG. 5A is a block diagram showing the outline of an operation control circuit of the linear drive motor of the present invention.
Figure 5B:
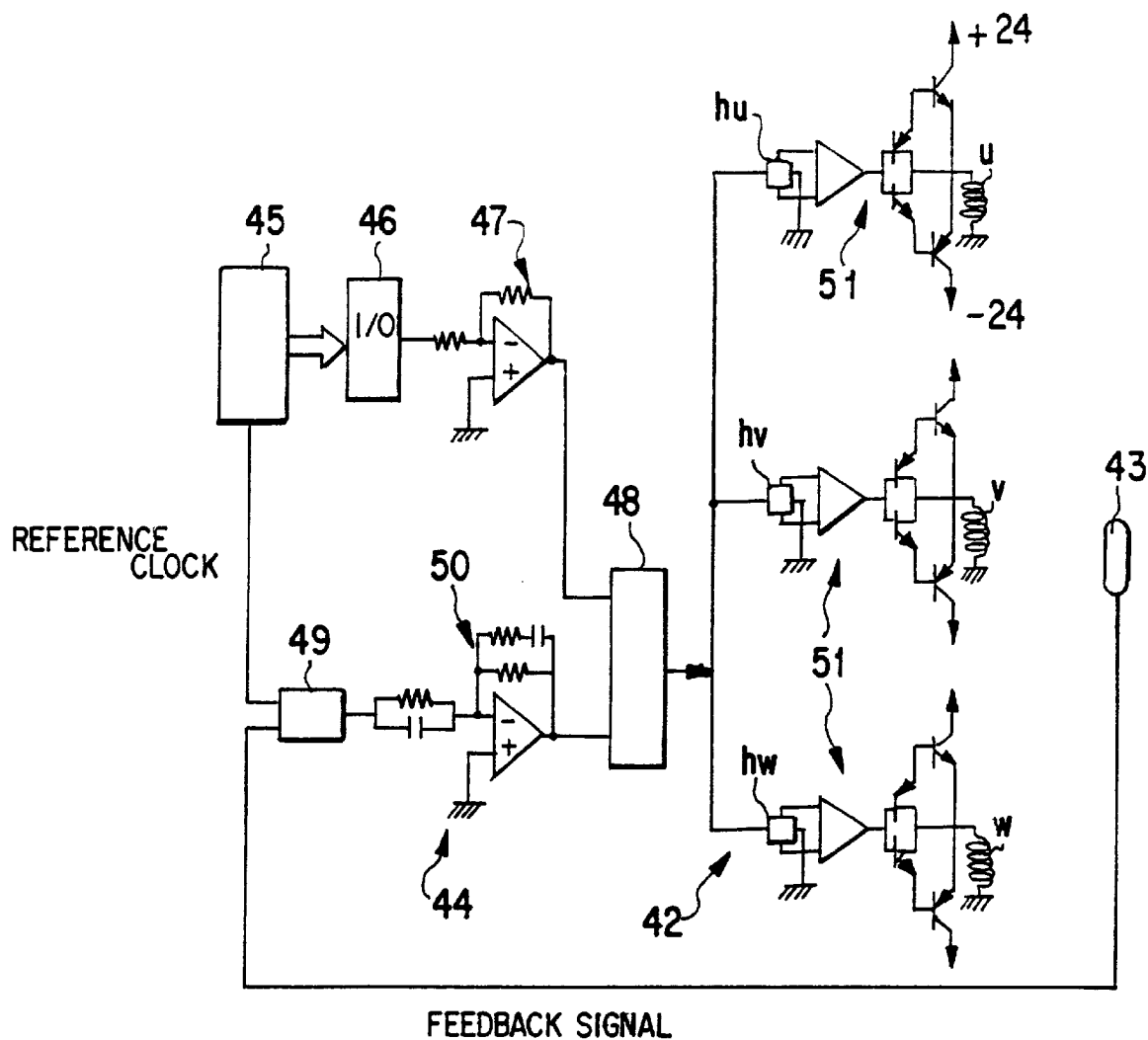
FIG. 5B shows important parts of the operation control circuit, including a speed control circuit using a phase lock loop method.

FIG. 5A shows a simplified block diagram of the electrical circuit for the control of the operation of linear drive motor LDM, and FIG. 5B shows important parts of the operation control circuit, including a speed control circuit using the PLL method.

In FIGS. 5A and 5B, 41 is a DC power source, 42 is a current control circuit including said Hall elements, and 43 is an encoder that detects the moving speed of movable piece 7, said encoder including a scale detecting sensor. 44 is a speed control unit using the PLL method. With regard to the linear drive motors shown in FIGS. 2 and 3, encoder 43 is a magnetic encoder in which magnetic sensor 43a on movable piece 2 reads the magnetism of fine magnetized member 12 of stator 1, and in the linear drive motor shown in FIG. 4, encoder 43 is an optical encoder in which optical sensor 43b on movable piece 2 reads the optical information from optical scale 13 of stator 1.

In FIG. 5B, 45 is a microcomputer that instructs prescribed operations of linear drive motor LDM and outputs reference clock signals to PLL unit 49, 46 is an input/output port of computer 45, 47 is an amplifier, 48 is a switching member, 49 is said PLL unit, 50 is a compensation circuit and 51 is an amplification circuit.

Using the control circuit shown in FIG. 5B, a reference clock signal corresponding to the target speed is input from computer 45 to PLL unit 49, and at the same time a feedback signal regarding the moving speed of movable piece 2 is input from encoder 43 to PLL unit 49. PLL unit 49 outputs a signal corresponding to the difference in frequency and phase between the pulse of the reference clock signal and the pulse of the feedback signal from encoder 43. Compensation circuit 50 compensates for speed-up and delay in the transmission system, and its output voltage is deemed the reference input voltage for the Hall element. As described above, the Hall element outputs a voltage that corresponds to the strength of the magnetic field at the position where it is located, and its output voltage increases or decreases in proportion to the reference input voltage. Therefore, an output voltage that corresponds to the difference between the reference clock signal and the feedback signal is output from the Hall element. The output voltage from the Hall element is proportionately amplified by amplification circuit 51 and is transmitted to the armature coil. The reference clock signal and the feedback signal are made to match in both frequency and pulse. In other words, linear drive motor LDM is operated such that it satisfies the target speed of movable piece 2.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A linear motor, comprising:
    a stator having a field magnet for propulsion, and
    a movable piece, wherein said movable piece includes:
        a bobbin which is located so as to wrap around said stator;
        an armature coil which is located around said bobbin;
        a sensor which detects magnetic information from said stator; and
        a thin member which is formed on said bobbin in order to place said sensor close to said stator.

2. A linear motor as claimed in claim 1, further comprising a wiring unit which reaches one end of said bobbin from said thin member so that said sensor is connected to a circuit.

3. A linear motor as claimed in claim 1, wherein said sensor detects the strength of the magnetic field from said field magnet.

4. A linear motor as claimed in claim 1, wherein said stator includes fine magnetized member, and wherein said sensor reads the magnetic information from the fine magnetized member.

5. A linear motor, comprising:
    a stator having field magnet for propulsion, and
    a movable piece, wherein said movable piece includes:
        a bobbin which is located so as to wrap around said stator;

an armature coil which is located around said bobbin;
a sensor which detects magnetic information and/or optical information from said stator; and
a hole which is formed on said bobbin in order to place said sensor close to and director facing said stator.

6. A linear motor as claimed in claim 5, further comprising a wiring unit which reaches one end of said bobbin from said hole so that said sensor is connected to a circuit.

7. A linear motor as claimed in claim 5, wherein said stator includes an optical scale, and wherein said sensor reads the optical information from the optical scale.

8. A linear motor, comprising:
a stator having a field magnet for propulsion, and
a movable piece, wherein said movable piece includes:
   a bobbin which includes a cylindrical member wrapping around said stator and a groove formed on the cylindrical member;
   an armature coil which is located around said bobbin; and
   a sensor which is arranged at the bottom of the groove and detects the strength of the magnetic field from said field magnet.

9. A linear motor as claimed in claim 8, wherein said bobbin further includes:
a flange provided on one end of said bobbin; and
a hole which is formed in said flange, and to which the groove leads.

10. A linear motor, comprising:
a stator having a field magnet for propulsion, and
a movable piece, wherein said movable piece includes:
   a bobbin which includes a cylindrical member configured so that its cross-section resembles the letter D;
   an armature coil which is located around said bobbin; and
   a sensor which is arranged on a plane portion of the cylindrical member and detects magnetic information from said stator.

11. A linear motor as claimed in claim 5, wherein the sensor detects magnetic information.

12. A linear motor as claimed in claim 5, wherein the sensor detects optical information.

13. A linear motor as claimed in claim 1, further comprising a yoke which is attached around said armature coil.

14. A linear motor as claimed in claim 5, further comprising a yoke which is attached around said armature coil.

15. A linear motor as claimed in claim 8, further comprising a yoke which is attached around said armature coil.

16. A linear motor as claimed in claim 10, further comprising a yoke which is attached around said armature coil.

* * * * *